(12) United States Patent
Segman

(10) Patent No.: US 6,178,272 B1
(45) Date of Patent: Jan. 23, 2001

(54) NON-LINEAR AND LINEAR METHOD OF SCALE-UP OR SCALE-DOWN IMAGE RESOLUTION CONVERSION

(75) Inventor: Yosef Segman, Yaacov (IL)

(73) Assignee: Oplus Technologies Ltd., Haifa (IL)

( * ) Notice: Under 35 U.S.C. 154(b), the term of this patent shall be extended for 0 days.

(21) Appl. No.: 09/241,434

(22) Filed: Feb. 2, 1999

(51) Int. Cl.$^7$ .................................................... G06K 9/32
(52) U.S. Cl. .......................................... 382/298; 382/299
(58) Field of Search .................................... 382/298, 299, 382/300; 345/127, 425; 708/290, 313

(56) References Cited

U.S. PATENT DOCUMENTS

| | | | |
|---|---|---|---|
| 4,790,028 | * 12/1988 | Ramage | 382/298 |
| 5,319,383 | * 6/1994 | Grothe et al. | 382/298 |
| 5,513,120 | * 4/1996 | Berlad | 364/723 |
| 5,701,138 | * 12/1997 | Othmer et al. | 382/298 |
| 5,886,682 | * 3/1999 | Biggs | 382/298 |
| 5,937,108 | * 8/1999 | Harris | 382/298 |

* cited by examiner

*Primary Examiner*—Yon J. Couso
(74) *Attorney, Agent, or Firm*—Mark M. Friedman

(57) ABSTRACT

A method of non-linear and linear scale-up or scale-down image resolution conversion of digital images. The method is based on using non-linear or linear pixel position control functions relating an output image pixel grid to an input image pixel grid, where resolution of each grid is different. The pixel position control functions enable calculation of real pixel position coordinates of output image pixels, embedded within the input image grid. A connection grid is set up as a graphical representation of using the pixel position control functions. Delta functional differences between real valued position coordinates of output pixels located in the connection grid, and neighbor pixel position coordinates located in the input image grid are defined and calculated. Linear combinations of known values of neighbor pixels in the input image grid, surrounding real valued pixel positions of output image pixels located in the connection grid, are used for calculating a new set of local coefficients for each output image pixel. A new value for each output pixel located in the output image grid is calculated by following a differential prescription for a two dimensional image using n neighbors, featuring an inner multiplication between a vector of the delta functional differences between pixel position coordinates, and a vector of the local coefficients. The method of this invention is applicable to cases of non-linear or linear, scale-up, scale-down, or mixed mode scale-up/scale-down image resolution conversion, and is extendable to a u dimensional image using v neighbors. Moreover, the method of this invention is applicable to interlaced or non-interlaced displays, featuring real time or still, digital color, grayscale, or black and white video images.

12 Claims, 4 Drawing Sheets

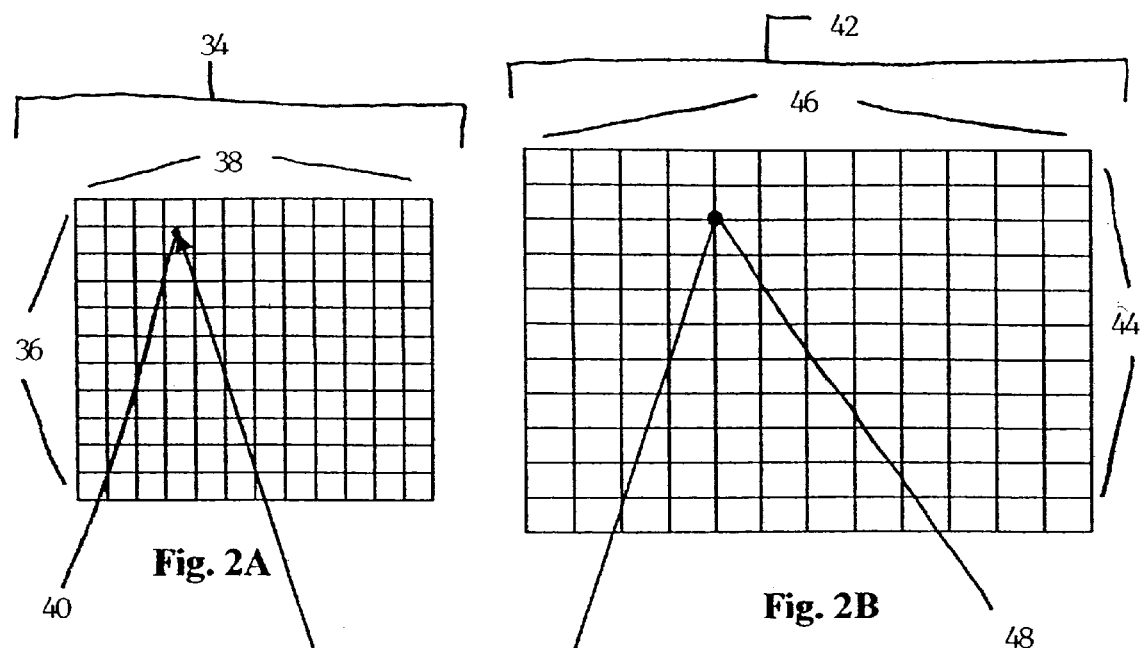
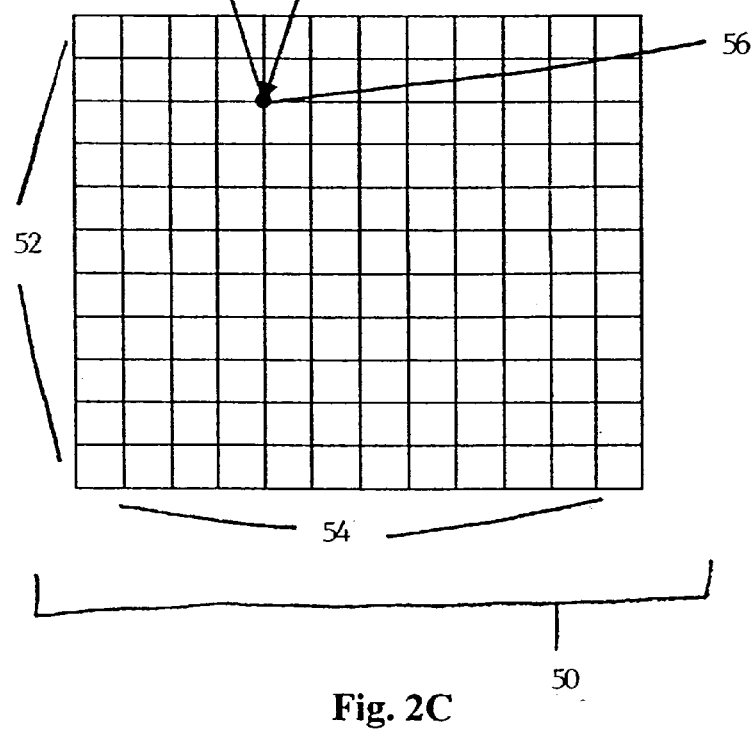
Fig. 2A
Fig. 2B
Fig. 2C

NON-LINEAR AND LINEAR METHOD OF SCALE-UP OR SCALE-DOWN IMAGE RESOLUTION CONVERSION

FIELD AND BACKGROUND OF THE INVENTION

The present invention relates to digital image processing. In particular, this invention relates to a non-linear and linear method of scaling up or scaling down the resolution of a digital input image to a defined output window.

Digital displays are characterized by their scan rate and pixel resolution. Standard non-interlaced displays have scan rate of at least 60 HZ and resolution of at least 480 lines (rows) by 640 pixels (columns) in each line. Non-interlaced displays are typically formatted as VGA, SVGA, XGA, SXGA and UGA, where each one has a different resolution and scan rate. It often occurs that various display systems are mixed together and transformation from one resolution to other is needed. For example, de-interlaced video images are usually of size 480 lines by 640 pixels resolution (VGA format). Such images are visualized relatively small when displayed on a monitor with pixel resolution capacity of 1200 lines by 1600 pixels. There is a need for a method of scaling up or scaling down the resolution of a digital input image to a defined output window, in order to display a video image over the entire resolution capacity of a display monitor having different resolution from the video image.

One of the most important characterizations of advanced, interlaced or non-interlaced, video screens is the ratio between the width (number of columns) and the height (number of rows) of the actual display area, commonly called the aspect ratio of the display screen. Currently, the most popular aspect ratio is 4:3 (for example, de-interlaced video images of size 480 rows by 640 columns or pixels (VGA format), or 1200 rows by 1600 columns). New screens are now available in the market with aspect ratios such as 16:9 or 21:9. High Definition TV screens typically have an aspect ratio of 16:9. In order to present images of one aspect ratio, for example 4:3, on displays having a different aspect ratio, for example 16:9, a sophisticated transformation that converts the image between aspect ratios is needed.

In such non-linear image resolution conversion cases, where the input and output conversion ratio is not 1:1, i.e., 4:3 ? 16:9, using standard linear resolution conversion methods on digital input images results in distortions within the corresponding output images. Various methods of video image resolution conversion and scaling have been developed, for non-linear or linear cases, most of which either feature or include linear interpolation processing for the purpose of either adding pixels by estimating values of missing pixels, or deleting pixels with known values, in the input image, for producing a converted output image. Using standard interpolation methods for adding missing pixels to an input image as part of forming an output image during scale-up resolution conversion, or for deleting pixels from an input image as part of forming an output image during scale-down resolution conversion, results in an output image either containing additional pixels in, or missing deleted pixels from, the initial input image, according to whether the image resolution conversion is scale-up, or scale-down, respectively. In such methods, input image data is simply used as a template for forming the output image. A more sophisticated method of image resolution conversion, and one in which higher quality results are obtained, is one which includes the formation of an entirely new output image, by calculating each output image pixel, in principle, from scratch, using input image pixels only as a starting point of resolution conversion, and not where all, or portions, of input image data simply become part of the output image. Moreover, many standard linear interpolation methods may not be computationally efficient for producing high quality resolution conversion images.

There is thus a need for a sophisticated, yet computationally efficient, non-linear transformation that minimizes distortions resulting from scale-up or scale-down resolution conversion with non-linear changes in display screen aspect ratios. There is also a need for, and it would be useful to have a sophisticated, yet computationally efficient linear transformation for performing scale-up or scale-down image resolution conversion, in cases where there is no change in aspect ratios between the video input image and the display output image.

Relative suitability of known methods of image resolution conversion ultimately depends on the resulting image quality. Moreover, different methods of image resolution conversion work better under different conditions.

U.S. Pat. No. 5,513,120 issued to Berlad, is based on a four-point linear interpolation method, using nearest neighbor grid points and the next nearest neighbor grid points that are in a line with the grid location point requiring interpolated data, for estimating missing pixels required for conversion of video images. Interpolation involves the use of Lagrange polynomials for determination of four interpolation coefficients and each output pixel value, whereby the texture of the image does not vary as a function of pixel location. The interpolation method can be extended to an n-dimensional display grid.

U.S. Pat. No. 5,574,572 issued to Malinowski et al., describes various configurations of a video scaling method and device featuring a linear interpolator and decimating FIR filter with constant coefficients for horizontal or vertical scaling of video images.

U.S. Pat. No. 5,119,082 issued to Lumelsky et al., features a pixel rate expansion circuit with a linear scaling method for video expansion, along with a means of defining a window as a subset of an entire display and scaling a video image to fit. The circuit includes a linear scaling mechanism, which causes selected adjacent scan lines to be repeated as they are read out of a frame buffer, for vertically and horizontally expanding an input image.

U.S. Pat. No. 5,559,905 issued to Greggain et al., describes a digital image resizing apparatus operating with a linear combination of interpolation filters. Filter coefficients are multiplied by input data and the results are shifted and sign extended to compensate for reduced precision of resizing the image.

U.S. Pat. No. 5,796,879 issued to Wong et al., teaches of using the technique of area-based interpolation for performing image interpolation, emphasizing scaling-up of images. Pixel values are determined from integrals of curves over an area proportional to a sampling size of an input image. Two integrators and two interpolation steps, including the use of a linear filter and evaluation of coefficients by solving linear polynomial equations, are required to achieve the desired image conversion.

U.S. Pat. No. 5,532,716 issued to Sano, describes a resolution conversion system for scaling-down images. The system operates with scaling factors proportional to input and output image sizes, and provides linear image conversion in both horizontal and vertical directions.

U.S. Pat. No. 5,446,831 issued to Yamashita et al., describes an image data processor for scaling-down an image. A base 2 logarithmic expression is used for changing the amount of data required for performing the desired resolution conversion. The image processor converts and reduces binary image data in both vertical and horizontal direction.

Additional methods of digital image resolution conversion include using an error diffusion technique, U.S. Pat. No. 5,208,871 issued to Eschbach, and an area mapping technique using reference clusters of a digitized input image, U.S. Pat. No. 5,758,034 and 5,689,343, issued to Loce et al.

SUMMARY OF THE INVENTION

The present invention relates to a non-linear and linear method of scale-up or scale-down image resolution conversion.

The method of non-linear and linear scale-up or scale-down image resolution conversion of the present invention features a new and unique method of relating image pixels of an output grid to image pixels of an input grid, by using non-linear or linear pixel position control functions. Moreover, output images are formed by generating entirely new sets of output pixel data, while being appropriately related to input image pixel data, in contrast to current standard methods of image resolution conversion featuring linear interpolation using input image pixel data as a template for forming an output image.

The method of the present invention allows one to maintain the aspect ratio of the output image equal to the aspect ratio of the input image during non-linear scale-up or scale-down image resolution conversion, featuring unequal aspect ratios of output and input images. For linear scale-up or scale-down image resolution conversion, aspect ratios of the output image and input image are the same. The present invention is a sophisticated, yet computationally efficient method of scale-up or scale-down image resolution conversion of video images. Resulting output images using the method of the present invention are of high quality and closely representative of original input images.

A preferred embodiment of a method of non-linear and linear scale-up or scale-down image resolution conversion of the present invention features the following principle steps: (1) Characterize an input image and its target output image. (a) Define and set up input and output image grids. (b) Determine scaling mode of the input image. (c) Determine if non-linear or linear image resolution conversion. (2) Convolute the input image with an FIR filter. (3) Define pixel position control functions relating pixel positions in output image grid to input image grid. Define and set up a connection grid using the position control functions. (4) Calculate real position coordinates of an output image pixel, embedded within the input image grid, using pixel position control functions and the connection grid. (5) Identify position coordinates of neighbor pixels in the input image grid, surrounding the real valued position of the output image pixel located in the connection grid. (6) Define and evaluate (delta) functional differences between real valued position coordinates of the output pixel located in the connection grid, and neighbor pixel position coordinates located in the input image grid. (7) Assign values to neighbor pixels in the input image grid, surrounding the real position of the output pixel located in the connection grid. (8) Define and calculate local coefficients from values of neighbor pixels in the input image grid, surrounding the real position of the output pixel located in the connection grid. (9) Calculate preliminary value of the output pixel. (10) Calculate and assign final value to the output pixel. (11) Calculate and assign a value to next output pixel by repeating steps (1) through (10). (12) Display completed resolution converted image.

According to the present invention, there is provided a non-linear and linear method of scale-up, scale-down, or mixed mode scale-up/scale-down image resolution conversion, the steps of the method being performed by a data processor, the method comprising the steps of: (a) receiving an input image featuring a plurality of pixels, the input image plotted in an input image grid, the input image grid featuring an input image grid coordinate system; (b) providing pixel position control functions, the pixel position control functions used to define and set up a connection grid with a connection grid coordinate system, whereby the pixel position control functions and the connection grid with the connection grid coordinate system each relate an output image grid with an output image grid coordinate system to the input image grid with the input image grid coordinate system; (c) calculating real position coordinates, located in the connection grid, of each of a plurality of output pixel positions, located in the output image grid, from the pixel position control functions; (d) determining position coordinates of neighbor pixels, located in the input image grid, surrounding each real position coordinates of each of a plurality of output pixel positions; (e) calculating differences between each real position coordinates of each of a plurality of output pixel positions and position coordinates of the neighbor pixels, located in the input image grid; (f) calculating for each of a plurality of output pixel positions, a new set of local coefficients from known values of the neighbor pixels surrounding each real position coordinates of each of a plurality of output pixel positions; (g) calculating a value for each of a plurality of output pixels located in the output image grid from a differential prescription for a two dimensional image featuring the pixels and featuring $n^2$ neighbor pixels, the differential prescription comprising an inner multiplication between two vectors, first of the two vectors featuring one-times dot multiplication of the differences between each real position coordinates defined over a two-dimensional connection grid coordinate system of each of a plurality of output pixel positions and position coordinates of the $n^2$ neighbor pixels defined over a two-dimensional input image grid coordinate system, and second of the two vectors featuring the set of local coefficients calculated from the known values of the $n^2$ neighbor pixels; and (h) displaying an output image featuring a value for each of a plurality of the output pixels located in the output image grid.

According to the present invention, there is provided a non-linear and linear method of scale-up, scale-down, or mixed mode scale-up/scale-down image resolution conversion featuring the use of pixel position control functions, the pixel position control functions used to define and set up a connection grid with a connection grid coordinate system, whereby the pixel position control functions and the connection grid with the connection grid coordinate system each relate an output image grid with an output image grid coordinate system to an input image grid with an input image grid coordinate system.

According to the present invention, there is provided a non-linear and linear method of scale-up, scale-down, or mixed mode scale-up/scale-down image resolution conversion, featuring calculating a value for each of a plurality of output pixels located in an output image grid from a differential prescription for a two dimensional image featuring pixels and featuring $n^2$ neighbor pixels, the differential prescription comprising an inner multiplication between two vectors, first of the two vectors featuring one-times dot multiplication of differences between each real position coordinates defined over a two-dimensional connection grid coordinate system of each of a plurality of output pixel positions and position coordinates of the $n^2$ neighbor pixels defined over a two-dimensional input image grid coordinate system, and second of the two vectors featuring a set of local coefficients calculated from known values of the $n^2$ neighbor pixels.

The present invention could be implemented by hardware or by software on any operating system of any firmware or a combination thereof. For example, as hardware, the invention could be implemented as a chip or a circuit. As software, the invention could be implemented as a plurality of software instructions being executed by a computer using any suitable operating system. In any case, the steps of the method of the invention could be described as being performed by a data processor, such as a computing platform for executing a plurality of instructions, regardless of the implementation of the present invention.

BRIEF DESCRIPTION OF THE DRAWINGS

The invention is herein described by way of example only, with reference to the accompanying drawings, wherein:

FIG. 2A is an illustration of an input grid, used for plotting a digitized video image (not shown), relating to the preferred embodiment of linear scale-up or scale-down image resolution conversion, according to the method of the present invention;

FIG. 2B is an illustration of an output grid, used for plotting the resolution converted digitized video image (not shown) of FIG. 2A, relating to the preferred embodiment of linear scale-up or scale-down image resolution conversion, according to the method of the present invention;

FIG. 2C is an illustration of a connection grid, showing the macro-level relationship between the input grid of FIG. 2A and the output grid of FIG. 2B, relating to the preferred embodiment of linear scale-up or scale-down image resolution conversion, according to the method of the present invention;

DESCRIPTION OF THE PREFERRED EMBODIMENTS

The present invention is of a non-linear and linear method of scaling-up or scaling-down the resolution of a digital image to a defined output window.

Scale-up image resolution conversion is described as follows. An input digital image (moving or still, color or not), I, of size M lines (rows) by N pixels (columns) per line, is to be converted into an output image, O, of size M1 lines by N1 pixels per line, where M1>M and/or N1>N, by increasing or scaling-up the total number of pixels in a portion of, or the entire input image, I.

Scale-down image resolution conversion is described as follows. An input digital image (moving or still, color or not), I, of size M lines (rows) by N pixels (columns) per line, is to be converted into an output image, O, of size M1 lines by N1 pixels per line, where M1<M and/or N1<N, by decreasing or scaling-down the total number of pixels in a portion of, or the entire input image, I.

Combination scale-up and scale-down image resolution conversion involves scaling-up lines and scaling-down columns of an input image, I, or, scaling-down lines and scaling-up columns of an input image, I, in order to generate an output image, O, of different resolution.

The method of the present invention is applicable to either non-linear or linear, scale-up or scale-down, image resolution conversion. The present method featuring non-linear scale-up or non-linear scale-down image resolution conversion is preferably applied to an input image when the output image aspect ratio, M1:N1, is not equal to the input image aspect ratio, M:N. The present method featuring linear scale-up or linear scale-down image resolution conversion is preferably applied to an input image when the output image aspect ratio, M1:N1, is equal to the input image aspect ratio, M:N.

Steps and implementations of a non-linear and linear method of scale-up or scale-down image resolution conversion, according to the present invention are better understood with reference to the drawings and the accompanying description. It is to be noted that illustrations of the present invention shown here are for illustrative purposes only and are not meant to be limiting.

Figures 1A, 1B, 1C:
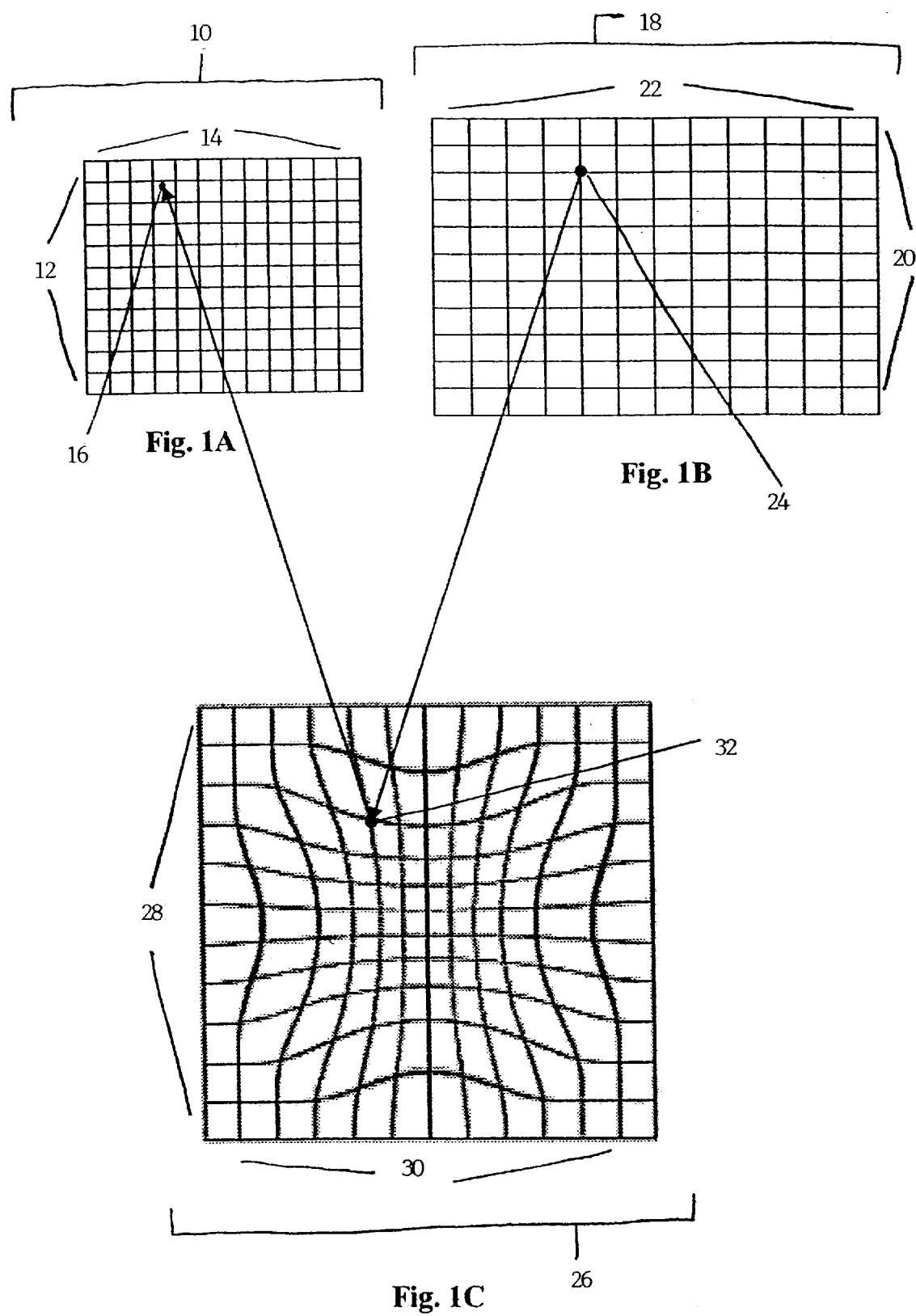
FIG. 1A is an illustration of an input grid, used for plotting a digitized video image (not shown), relating to the preferred embodiment of non-linear scale-up or scale-down image resolution conversion, according to the method of the present invention.
FIG. 1B is an illustration of an output grid, used for plotting the resolution converted digitized video image (not shown) of FIG. 1A, relating to the preferred embodiment of non-linear scale-up or scale-down image resolution conversion, according to the method of the present invention.
FIG. 1C is an illustration of a connection grid, showing the macro-level relationship between the input grid of FIG. 1A and the output grid of FIG. 1B, relating to the preferred embodiment of non-linear scale-up or scale-down image resolution conversion, according to the method of the present invention.

Referring now to the drawings, FIG. 1A is an illustration of a graphical input grid 10, used for plotting a digitized video image, I, (not shown), relating to the preferred embodiment of non-linear scale-up or scale-down image resolution conversion, according to the method of the present invention. The input grid 10 features rows (lines) 12, and columns (pixels) 14, with each input grid location identifiable by coordinates of row number i, and column number j. I(i,j) represents the value of a pixel 16 of a digitized input image (not shown) which can be plotted in input grid 10, and whose position coordinates in input grid 10 are indicated by row i, and column j. For a digital input image, I, of size M rows by N columns, position indices (i,j) are limited to the input image size as follows: i; 0,1,2, . . . M-1; and j: 0,1,2, . . . N-1. In general, indices i and j can be real or integer. In this preferred embodiment of the present invention, position coordinates row i and column j, and corresponding position indices (i,j), are integers (i.e., not real), translating to integer valued position indices of a pixel 16 in input grid 10. Digitized video image, I, having a known resolution, is to undergo non-linear scale-up or scale-down image resolution conversion, in order to enable its display on a digitized output grid having a different resolution.

FIG. 1B is an illustration of, initially empty valued, graphical output grid 18, used for plotting the resolution converted digitized video image (not shown) of FIG. 1A, relating to the preferred embodiment of non-linear scale-up or scale-down image resolution conversion, according to the method of the present invention. The output grid 18 features rows (lines) 20, and columns (pixels) 22, with each output grid location identifiable by coordinates of row number s, and column number t. O(s,t) represents the value of a pixel 24 of a digitized output image (not shown) which can be plotted in output grid 18, and whose position coordinates in output grid 18 are indicated by row s, and column t. For a digital output image, O, of size M1 rows by N1 columns, the position indices (s,t) are limited to the output image size as follows: s: 0,1,2, . . . M1−1; and t: 0,1,2, . . . N1−1. In general, indices s and t can be real or integer. In this preferred embodiment of the present invention, position coordinates row s and column t, and corresponding position indices (s,t), of exemplary pixel 24, are integer (i.e., not real) valued in output grid 18.

FIG. 1C is an illustration of a graphical connection grid 26, showing the macro-level relationship between output grid 18 (FIG. 1B), and input grid 10 (FIG. 1A), relating to the preferred embodiment of non-linear scale-up or scale-down image resolution conversion, according to the method of the present invention. The utility of connection grid 26 is to relate pixel positions of output grid 18 (FIG. 1B) to pixel positions of input grid 10 (FIG. 1A), taking into account non-linear effects during image resolution conversion. Connection grid 26 features rows (lines) 28, and columns 30, with each connection grid location identifiable by coordinates of row number $y_i$, and column number $x_j$. In general, indices $y_i$, and $x_j$ can be real or integer. In this preferred embodiment of the present invention, position coordinates row $y_i$, and column $x_j$, and corresponding position indices $(y_i,x_j)$ of an exemplary pixel position 32, are real (i.e., not integer) valued in connection grid 26.

In connection grid 26 (FIG. 1C), subscript i of row y, and subscript j of column x, are used in order to relate or connect between position coordinates, or indices, of output image, O(s,t) (not shown), which can be plotted in output grid 18 (FIG. 1B), and position coordinates, or indices, of input image, I(i,j), which can be plotted in input grid 10 (FIG. 1A). Exemplary pixel position indices $(y_i,x_j)$ 32, in connection grid 26, are real position indices, pointing out to the exact position of a pixel 16 of input image, I(i,j), which can be plotted in input grid 10 (FIG. 1A).

In the non-linear case of the preferred embodiment of the method of scale-up or scale-down image resolution conversion of the present invention, the non-linear relationship between output indices (s,t), of output grid 18 (FIG. 1B), and input indices, (i,j), of input grid 10 (FIG. 1A), is represented functionally as follows: $y_i=F_i(s,t,a,b,\lambda_1,\mu_1)$, and $x_j=F_j(s,t,a,b,\lambda_2,\mu_2)$. $F_i$ and $F_j$ are non-linear pixel position control functions, $\lambda_1, \mu_1, \lambda_2$, and $\mu_2$ are free parameters that control the extent of non-linearity during image resolution conversion from input grid 10 (FIG. 1A), to output grid 18 (FIG. 1B), and, a and b are scale factors (ratios), relating output to input image sizes, where a=M1/M, or (number of rows of output image, O) divided by (number of rows of input image, I), and b=N1/N, or (number of columns of output image, O) divided by (number of columns of input image I), where a>0 and b>0 are real positive numbers.

Based on the assignment of scale factor a, and in its use in the equations for calculating values of connection grid indices $(y_i,x_j)$ 32, for a >1, there is an increase in the number of rows in converting from input to output image, as such, rows 12 of input image, I, in input grid 10 (FIG. 1A), are non-linearly scaled-up to rows 20 of output image, O, in output grid 18 (FIG. 1B). For 0<a<1, there is a decrease in the number of rows in converting from input to output image, and rows 12 of input image, I, in input grid 10 (FIG. 1A), are non-linearly scaled-down to rows 20 of output image, O, in output grid 18 (FIG. 1B). In a similar way, based on the assignment of scale factor b, for b>1, there is an increase in the number of columns in converting from input to output image, as such, columns 14 of input image, I, in input grid 10 (FIG. 1A), are non-linearly scaled-up to columns 22 of output image, O, in output grid 18 (FIG. 1B). For 0<b<1, there is a decrease in the number of columns in converting from input to output image, and columns 14 of input image, I, in input grid 10 (FIG. 1A), are non-linearly scaled-down to columns 22 of output image, O, in output grid 18 (FIG. 1B).

FIG. 2A is an illustration of a graphical input grid 34, used for plotting a digitized video image, I, (not shown), relating to the preferred embodiment of linear scale-up or scale-down image resolution conversion, according to the method of the present invention. The input grid 34 features rows (lines) 36, and columns (pixels) 38, with each input grid location identifiable by coordinates of row number i, and column number j. I(i,j) represents the value of a pixel 40 of a digitized input image (not shown) which can be plotted in input grid 34, and whose position coordinates in input grid 34 are indicated by row i, and column j. For a digital input image, I, of size M rows by N columns, position indices (i,j) are limited to the input image size as follows: i: 0,1,2, . . . M−1; and j: 0,1,2, . . . N−1. In general, indices i and j can be real or integer. In this preferred embodiment of the present invention, position coordinates row i and column j, and corresponding position indices (i,j), are integers (i.e., not real), translating to integer valued position indices of a pixel 40 in input grid 34. Digitized video image, I, having a known resolution, is to undergo linear scale-up or scale-down image resolution conversion, in order to enable its display on a digitized output grid having a different resolution.

FIG. 2B is an illustration of, initially empty valued, graphical output grid 42, used for plotting the resolution converted digitized video image (not shown) of FIG. 2A, relating to the preferred embodiment of linear scale-up or scale-down image resolution conversion, according to the method of the present invention. The output grid 42 features rows (lines) 44, and columns (pixels) 46, with each output grid location identifiable by coordinates of row number s, and column number t. O(s,t) represents the value of a pixel 48 of a digitized output image (not shown) which can be plotted in output grid 42, and whose position coordinates in output grid 42 are indicated by row s, and column t. For a digital output image, O, of size M1 rows by N1 columns, the position indices (s,t) are limited to the output image size as follows: s: 0,1,2, . . . M1−1; and t: 0,1,2, . . . N1−1. In general, indices s and t can be real or integer. In this preferred embodiment of the present invention, position coordinates row s and column t, and corresponding position indices (s,t), of exemplary pixel 48, are integer (i.e., not real) valued in output grid 42.

FIG. 2C is an illustration of a graphical connection grid 50, showing the macro-level relationship between output grid 42 (FIG. 2B), and input grid 34 (FIG. 2A), relating to the preferred embodiment of linear scale-up or scale-down image resolution conversion, according to the method of the present invention. The utility of connection grid 50 is to relate pixel positions of output grid 42 (FIG. 2B) to pixel positions of input grid 34 (FIG. 2A), taking into account linear effects during image resolution conversion. Connection grid 50 features rows (lines) 52, and columns 54, with each connection grid location identifiable by coordinates of row number $y_i$, and column number $x_j$. In general, indices $y_i$, and $x_j$ can be real or integer. In this preferred embodiment of the present invention, position coordinates row $y_i$, and column $x_j$, and corresponding position indices $(y_i, x_j)$ of an exemplary pixel position 56, are real (i.e., not integer) valued in connection grid 50.

In connection grid 50 (FIG. 2C), subscript i of row y, and subscript j of column x, are used in order to relate or connect between position coordinates, or indices, of output image, O(s,t) (not shown), which can be plotted in output grid 42 (FIG. 2B), and position coordinates, or indices, of input image, I(i,j), which can be plotted in input grid 34 (FIG. 2A). Exemplary pixel position indices $(y_i, x_j)$ 56, in connection grid 50, are real position indices, pointing out to the exact position of a pixel 40 of input image, I(i,j), which can be plotted in input grid 34 (FIG. 2A).

In the linear case of the preferred embodiment of the method of scale-up or scale-down image resolution conversion of the present invention, the linear relationship between output indices (s,t) of output grid 42 (FIG. 2B), and input indices, (i,j), of input grid 34 (FIG. 2A), is represented functionally as follows: $y_i = F_i(s, t, a, b, \lambda_1, \mu_1)$, and $x_j = F_j(s, t, a, b, \lambda_2, \mu_2)$. $F_i$ and $F_j$ are linear pixel position control functions, $\lambda_1, \mu_1, \lambda_2,$ and $\mu_2$ are free parameters which may be used during the linear image resolution conversion from input grid 10 (FIG. 1A), to output grid 18 (FIG. 1B), and, a and b are scale factors (ratios), relating output to input image sizes, where a=M1/M, or (number of rows of output image, O) divided by (number of rows of input image, I), and b=N1/N, or (number of columns of output image, O) divided by (number of columns of input image, I), and where a>0 and b>0 are real positive numbers.

For scale factor a>1, there is an increase in the number of rows in converting from input to output image, and rows 36 of input image, I, in input grid 34 (FIG. 2A), are linearly scaled-up to rows 44 of output image, O, in output grid 42 (FIG. 2B). For 0<a<1, there is a decrease in the number of rows in converting from input to output image, and rows 36 of input image, I, in input grid 34 (FIG. 2A), are linearly scaled-down to rows 44 of output image, O, in output grid 42 (FIG. 2B). For scale factor b>1, there is an increase in the number of columns in converting from input to output image, and columns 38 of input image, I, in input grid 34 (FIG. 2A), are linearly scaled-up to columns 46 of output image, O, in output grid 42 (FIG. 2B). For 0<b<1, there is a decrease in the number of columns in converting from input to output image, and columns 38 of input image, I, in input grid 34 (FIG. 2A), are linearly scaled-down to columns 46 of output image, O, in output grid 42 (FIG. 2B).

Figure 3:
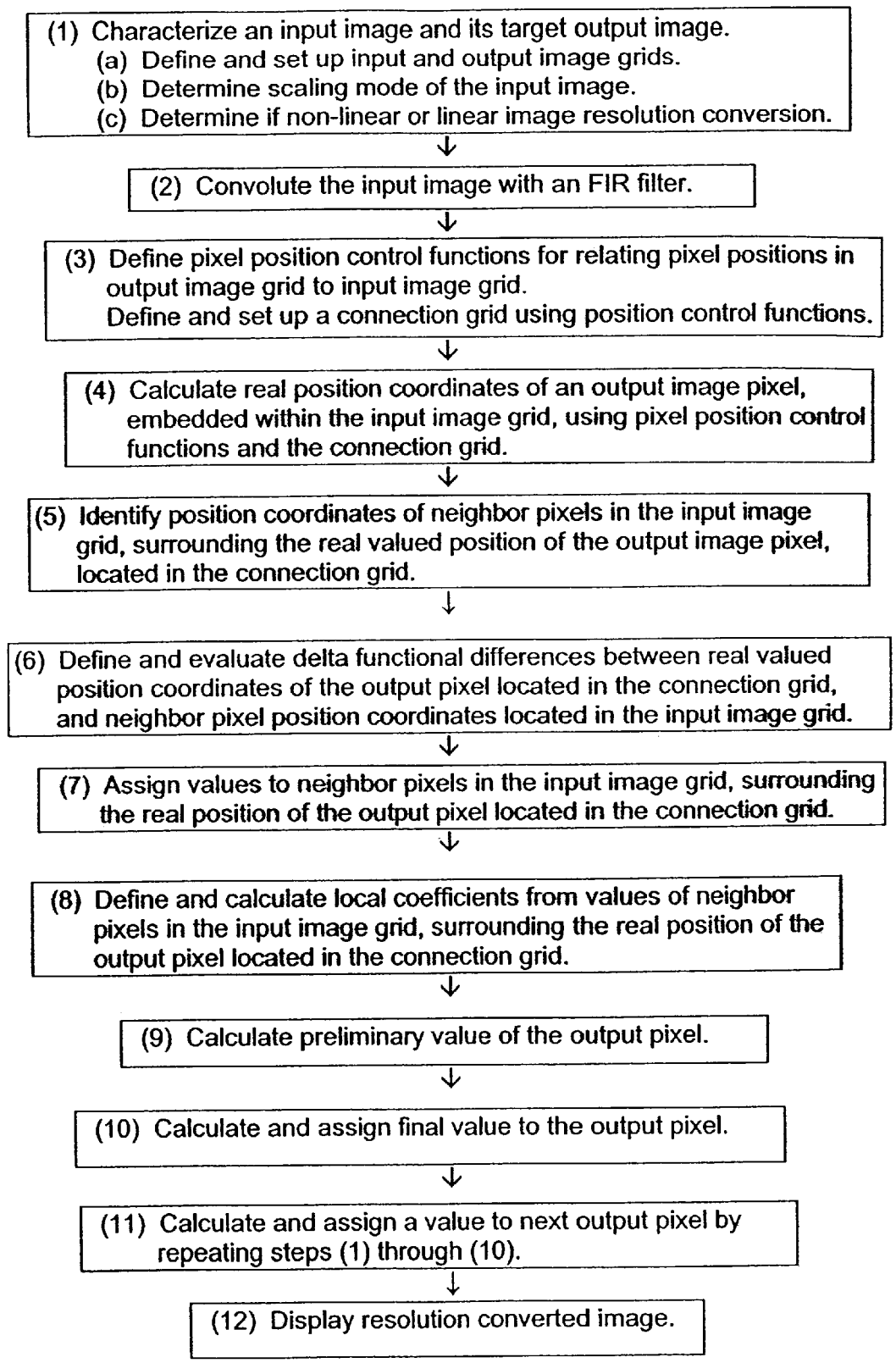
FIG. 3 is a flow diagram of a preferred embodiment of the non-linear and linear method of scale-up or scale-down image resolution conversion, according to the present invention.

FIG. 3 is a flow diagram of a preferred embodiment of the non-linear and linear method of scale-up or scale-down image resolution conversion, according to the present invention. The preferred embodiment of the non-linear and linear method of scale-up or scale-down image resolution conversion, according to the present invention, shown in FIG. 3, is generally applicable to either the case of non-linear scale-up or scale-down image resolution conversion, or, the case of linear scale-up or scale-down image resolution conversion. Specific differences in application of this preferred embodiment of the present invention, to the cases of non-linear or linear, scale-up or scale-down image resolution conversion, are clearly indicated in the following description of FIG. 3.

In FIG. 3, each generally applicable, principle step of the non-linear and linear method of scale-up or scale-down image resolution conversion is numbered and enclosed inside a frame. Notation and symbols appearing in the following description of FIG. 3 are consistent with those used in the description of FIGS. 1A, 1B, and 1C, for the specific case of non-linear scale-up or scale-down image resolution conversion; and with those used in the descriptions of FIGS. 2A, 2B, and 2C, for the specific case of linear scale-up or scale-down image resolution conversion. Included in the description of FIG. 3, are definitions of relevant terms, mathematical expressions, and one or more substeps representing further of the indicated principle method step of the non-linear and linear method of scale-up or scale-down image resolution conversion shown in FIG. 3. Substeps are indicated by a letter in parentheses, and the multiplication operation is indicated by an asterisk(*).

Referring now to FIG. 3, a preferred embodiment of the non-linear and linear method of scale-up and scale-down image resolution conversion, according to the present invention is as follows.

In Step 1, an input image having a known resolution, and its target output image having a different resolution are characterized. In step (a), input and output image grids, and their respective coordinate systems are defined and set up (FIGS. 1A and 1B, for the case of non-linear image resolution conversion; and FIGS. 2A and 2B, for the case of linear image resolution conversion) as follows:

I(i,j) represents the value of a pixel (16 in FIG. 1A, or 40 in FIGS. 2A) of a digitized input image (not shown) which can be plotted in an input grid (10 in FIG. 1A, or 34 in FIG. 2A), and whose position coordinates in input grid (10 in FIG. 1A, or 34 in FIG. 2A) are indicated by row i, and column j. For a digital input image, I, of size M rows by N columns, position indices (i,j) are limited to the input image size as follows: i: 0,1,2,... M-1; and j: 0,1,2, ... N-1. In general, indices i and j can be real or integer. In this preferred embodiment of the present invention, position coordinates row i and column j, and corresponding position indices (i,j), are integers (i.e., not real), translating to integer valued position indices of an input pixel (16 in FIG. 1A, or 40 in FIG. 2A).

O(s,t) represents the value of a pixel (24 in FIG. 1B, or 48 in FIG. 2B) of a digitized output image (not shown) which can be plotted in, initially empty valued, output grid (18 in FIG. 1B, or 42 in FIG. 2B), and whose position coordinates in output grid (18 in FIG. 1B, or 42 in FIG. 2B) are indicated by row s, and column t. For a digital output image, O, of size M1 rows by N1 columns, the position indices (s,t) are limited to the output image size as follows: s:0,1,2, . . . M1-1; and t: 0,1,2, . . . N1-1. In general, indices s and t can be real or integer. In this preferred embodiment of the present invention, position coordinates row s and column t, and corresponding position indices (s,t), are integers (i.e., not real), translating to integer valued position indices of an output pixel (24 in FIG. 1B, or 48 in FIG. 2B).

In step (b) of Step 1, determination is made of the scaling mode, i.e., scale-up, scale-down, or mixed mode scale-up and scale-down of the input image resolution, according to the change in image size, based on the change in number of rows and columns, in converting input image, I, to target output image, O, as follows:

Define a and b as scale factors (ratios), relating output to input image sizes, where a=M1/M, or (number of rows of output image, O) divided by (number of rows of input image, I), and b=N1/N, or (number of columns of output image, O) divided by (number of columns of input image, I), where a>0 and b>0 are real positive numbers.

For scale factor a>1, there is an increase in the number of rows in converting from input to output image. Rows 12 of input image, I, in input grid 10 (FIG. 1A), are non-linearly scaled-up to rows 20 of output image, O, in output grid 18 (FIG. 1B), or, rows 36 of input image, I, in input grid 34 (FIG. 2A), are linearly scaled-up to rows 44 of output image, O, in output grid 42 (FIG. 2B). For 0<a<1, there is a decrease in the number of rows in converting from input to output image. Rows 12 of input image, I, in input grid 10 (FIG. 1A), are non-linearly scaled-down to rows 20 of output image, O, in output grid 18 (FIG. 1B), or, rows 36 of input image, I, in input grid 34 (FIG. 2A), are linearly scaled-down to rows 44 of output image, O, in output grid 42 (FIG. 2B).

For scale factor b>1, there is an increase in the number of columns in converting from input to output image. Columns 14 of input image, I, in input grid 10 (FIG. 1A), are non-linearly scaled-up to columns 22 of output image, O, in output grid 18 (FIG. 1B), or, columns 38 of input image, I, in input grid 34 (FIG. 2A), are linearly scaled-up to columns 46 of output image, O, in output grid 42 (FIG. 2B). For 0<b<1, there is a decrease in the number of columns in converting from input to output image. Columns 14 of input image, I, in input grid 10 (FIG. 1A), are non-linearly scaled-down to columns 22 of output image, O, in output grid 18 (FIG. 1B), or, columns 38 of input image, I, in input grid 34 (FIG. 2A), are linearly scaled-down to columns 46 of output image, O, in output grid 42 (FIG. 2B).

In step (c) of Step 1, determination is made whether the image resolution conversion is non-linear or linear, according to the ratio of the aspect ratio of the output image to the aspect ratio of the input image, as follows:

M1:N1=output image aspect ratio. M:N=input image aspect ratio

For M1:N1?M:N, non-linear scale-up or non-linear scale-down image resolution conversion is preferably applied to the input image (10 in FIG. 1A).

For M1:N1=M:N, linear scale-up or linear scale-down image resolution conversion is preferably applied to the input image (34 in FIG. 2A).

In Step 2, the input image (10 in FIG. 1A, or 34 in FIG. 2A) is convoluted with an FIR (Finite Impulse Response) filter, according to a standard FIR convolution method.

In Step 3, pixel position control functions to be used for relating pixel positions (s,t) in the output image grid (18 in FIG. 1B, or 42 in FIG. 2B) to pixel positions (i,j) in the input image grid (10 in FIG. 1A, or 34 in FIG. 2A) are defined. The general forms of the pixel position control functions, applicable to either case of non-linear or linear, scale-up or scale-down image resolution conversion are represented as follows:

$F_i = F(s,t,a,b,\lambda_1,\mu_1)$, for scaling rows of coordinate i, of input image grid (10 in FIG. 1A, or 34 in FIG. 2A) and $F_j = F(s,t,a,b,\lambda_2,\mu_2)$, for scaling columns of coordinate j, of input image grid (10 in FIG. 1A, or 34 in FIG. 2A), where $\lambda_1$, $\mu_1$, $\lambda_2$, and $\mu_2$ are free parameters that control the extent of non-linearity during image resolution conversion from the input grid (10 in FIG. 1A, or 34 in FIG. 2A), to the output grid (18 in FIG. 1B, or 42 in FIG. 2B), and, a and b are the scale factors (ratios), relating output to input image sizes, where a=M1/M, and b=N1/N, where a>0 and b>0 are real positive numbers. In the case of non-linear scale-up or scale-down image resolution conversion, non-linear position control functions are preferably used in calculating real position coordinates of output image pixel, located in the connection grid (26 in FIG. 1C). In the case of linear scale-up or scale-down image resolution conversion, linear position control functions are preferably used in calculating real position coordinates of output image pixels, located in the connection grid (50 in FIG. 2C).

Step 3 also includes definition and set up of a connection grid, and its associated coordinate system, based on and graphically representing the connection between pixel positions in the output image and input image (FIG. 1C), for the case of non-linear image resolution conversion; and FIG. 2C, for the case of linear image resolution conversion), according to the previously defined pixel position control functions. For illustrative purposes, a connection grid is defined and set up for each case of non-linear, and linear, scale-up or scale-down image resolution conversion.

In the case of non-linear scale-up or scale-down image resolution conversion, connection grid 26 (FIG. 1C) shows the macro-level relationship between output grid 18 (FIG. 1B), and input grid 10 (FIG. 1A). Connection grid 26 (FIG. 1C) relates pixel positions of output grid 18 (FIG. 1B) to pixel positions of input grid 10 (FIG. 1A), taking into account non-linear effects during image resolutions conversion. Connection grid 26 (FIG. 1C). features rows 28, and columns 30, with each connection grid location identifiable by coordinates of row number $y_i$, and column number $x_j$. In general, indices $y_i$, and $x_j$ can be real or integer. In this preferred embodiment of the present invention, position coordinates row $y_i$, and column $x_j$, and corresponding position indices $(y_i, x_j)$ of an exemplary pixel position 32, are real (i.e., not integer) valued in connection grid 26 (FIG. 1C). In connection grid 26 (FIG. 1C), subscript i of row y, and subscript j of column x, are used in order to relate or connect between position coordinates, or indices, of output image, O(s,t), which can be plotted in output grid 18 (FIG. 1B), and position coordinates, or indices, of input image, I(i,j), which can be plotted in input grid 10 (FIG. 1A). exemplary pixel position indices $(y_i, x_j)$ 32, in connection grid 26 (FIG. 1C), are real position indices, pointing out to the exact position of a pixel 16 of input image, I(i,j), which can be plotted in input grid 10 (FIG. 1A). Real pixel position coordinates $(y_i, x_j)$ 32, in connection grid 26 (FIG. 1C) are calculated preferably using non-linear forms of the previously defined pixel position control functions.

In the case of linear scale-up or scale-down image resolution conversion, connection grid 50 (FIG. 2C) shows the macro-level relationship between output grid 42 (FIG. 2B), and input grid 34 (FIG. 2A). The utility of connection grid 50 (FIG. 2C) is to relate pixel positions of output grid 42 (FIG. 2B) to pixel positions of input grid 34 (FIG. 2A), taking into account linear effects during image resolution conversion. Connection grid 50 (FIG. 2C) features rows 52, and columns 54, with each connection grid location identifiable by coordinates of row number $y_i$, and column number $x_j$. In general, indices $y_i$, and $x_j$ can be real or integer. In this preferred embodiment of the present invention, position coordinates row $y_i$, and column $x_j$, and corresponding position indices $(y_i, x_j)$ of an exemplary pixel position 56, are real (i.e., not integer) valued in connection grid 50 (FIG. 2C). In connection grid 50 (FIG. 2C), subscript i of row y, and subscript j column x, are used in order to relate or connect between position coordinates, or indices, of output image )(s,t), which can be plotted in output grid 42 (FIG. 2B), and position coordinates, or indices, of input image, I(i,j), which can be plotted in input grid 34 (FIG. 2A). Exemplary pixel position indices $(y_i,x_j)$ 56, in connection grid 50 (FIG. 2C), are real position indices, pointing out to the exact position of a pixel 40 of input image, I(i,j), which can be plotted in input grid 34 (FIG. 2A). Real pixel position coordinates $(y_i,x_j)$ 32, in connection grid 26 (FIG. 1C) are calculated preferably using linear forms of the previously defined pixel position control functions.

In Step 4, real position coordinates of an output image pixel, embedded within the input image grid, are calculated using the pixel position control functions of Step 3. for illustrative purposes calculations of real position coordinates of an output image pixel are shown for each case of non-linear, and linear, scale-up or scale-down image resolution conversion.

In the case of non-linear scale-up or scale-down image resolution conversion (FIGS. 1A, 1B, and 1C), three modes of non-linear scaling-up or scaling-down image resolution, relating to calculation of real position coordinates of an output image pixel, embedded within the input image grid, using the pixel position control functions of Step 3, are featured here. Parameters, and their value domains, required for evaluating the non-linear pixel positions control functions are described.

Non-line Mode (a): Vertical and horizontal non-linear scaling, whereby the number of columns 14 (FIG. 1A) and the number of rows 12 (FIG. 1A) of input image, I (not shown), in input image grid 10 (FIG. 1A), are non-linearly scaled-up or scaled-down, to the number of columns 22 (FIG. 1B) and the number of rows 20 (FIG. 1B) of output image, O (not shown), in output image grid 18 (FIG. 1B), respectively.

For vertical non-linear scaling of the number of rows, define parameters A0, A1, and A2 as follows:

$U=\lambda_2*(b/a)$, and $Y=1/[(\mu_2*b)+(1-\mu_2)*a]$, where U and Y are parameters which control the extent of non-linearity of the coefficients of the following $2^{nd}$ degree polynomial equation, related to the extent of non-linearity of the image resolution conversion, used for calculation of parameters A0, A1, and A2.

TmpA0=$[Y-1/a-U*(1/a-1/b)]/[U*(U-1)]$,

TmpA1=$1/b-1/a$-TmpA0,

A0=TmpA0/(M12*M12),

A1=Tmp A1/M12, and

A2=1/b.

TmpA0, and TmpA1 are free parameters, and M12 is defined as a half-size, calculated as M12=M1/2, or M12 equals one-half the number of rows 20 (FIG. 1B) of output image, O, in output image grid 18 (FIG. 1B). The utility of M12 is to enable calculation of the real positions of output image pixels to start at the center of connection grid 26 (FIG. 1C). This leads to generation of a symmetrical resolution converted output image, O, in output image grid 18 (FIG. 1B), in which the aspect ratio of the output image, O, in output image grid 18 (FIG. 1B), is maintained equal to the aspect ratio of the input image, I, in input image grid 10 (FIG. 1A), from the center outward, whereby the center portion of the resolution converted output image, O, in output image grid 18 (FIG. 1B), closely represents that of original input image, I, in input image grid 10 (FIG. 1A), and whereby distortions due to non-linear effects during image resolution conversion are pushed to the corners of the newly generated output image, O, in output image grid 18 (FIG. 1B).

For each row 20 (FIG. 1B) in output image grid 18 (FIG. 1B), having coordinate s, for s=0,1,2,. . . M1, calculate.

$\Delta_r$=s–M12, where the range of $\Delta_r$ is from –M2 to M2–1,

Tangent_row=$(A0*\Delta_r*\Delta_r)+A1*|\Delta_r|+A2$, and $F_1=\Delta_r*$(Tangent_row)+M2, where $F_i$ is a real number, which corresponds to a specific form of the general pixel position control function, $F_i=F(s,t,a,b,\lambda_1,\mu_1)$, for scaling rows of coordinate i, in input image grid 10 (FIG. 1A), Row coordinate, $y_i$, of the real position $(y_i,x_j)$, of output pixel 24 (in output image grid 18, FIG. 1B), located in connection grid 26 (FIG. 1C), is calculated from $F_i$, as:

$y_i=F_i=\Delta_r*$(Tangent_row)+$M_2$.

For horizontal non-linear scaling of the number of columns, define parameters P0, P1, and P2 as follows:

$W=\lambda_1*(a/b)$, and $V=1/[(\mu_1*a)+(1-\mu_1)*b]$, where W and V are parameters which control the extent of non-linearity of the coefficients of the following $2^{nd}$ degree polynomial equation, related to the extent of non-linearity of the image resolution conversion, used for calculation of parameters P0, P1, and P2.

TmpP0=$[V-1/a-W*(1/b-1/a)]/[W*(W-1)]$,

TmpP1=$1/b-1/a$-TempP0

P0=TmpP0/(N12*N12),

P1=TmpP1/N12, and

P2=1/a.

TmpP0 and TmpP1 are free parameters, and N12 is defined as a half-size calculated as N12 =N1/2, or N12 equals one-half the number of columns 22 (FIG. 1B) of output image, O, in output image grid 18 (FIG. 1B). The utility of N12 is to enable calculation of the real positions of output image pixels to start at the center of connection grid 26 (FIG. 1C). This leads to generation of a symmetrical resolution converted output image, O, in output image grid 18 (FIG. 1B), in which the aspect ratio of the output image, O, in output image grid 18 (FIG. 1B), is maintained equal to the aspect ratio of the input image, I, in input image grid 10 (FIG. 1A), outward from the center, whereby the center position of the resolution converted output image, O, in output image grid 18 (FIG. 1B), closely represents that of original input image, I, in input image grid 10 (FIG. 1A), and whereby distortions due to non-linear effects during image resolution conversion are pushed to the corners of the newly generated output image, O, in output image grid 18 (FIG. 1B).

For each column 22 (FIG. 1B) in output image grid 18 (FIG. 1B), having coordinate t, for t=0,1,2,. . . N1, calculate:

$\Delta_c$=t–N12 , where the range of $\Delta_c$ is from –N2 to N2–1,

Tangent_column =$(P0*\Delta_c*\Delta_c)+P1*|\Delta_c|=P2$, and $F_j=\Delta_c*$(Tangent$_{13}$column)=N2, where $F_j$ is a real number, which corresponds to a specific form of the general pixel position control function, $F_j=F(s,t,a,b,\lambda_2, \mu_2)$, for scaling columns of coordinate j, in input image grid 10 (FIG. 1A). column coordinate, $x_j$, of the real position $(y_i,x_j)$, of output pixel 24 (in output image grid 18, FIG. 1B), located in connection grid 26 (FIG. 1C), is calculated from $F_j$, as:

$x_j=F_j=\Delta_c*$(Tangent$_{13}$column)+$N2$.

Thus, for non-linear mode (a), featuring vertical and horizontal non-linear scaling of both the number of rows and columns of input image, I, to the number of rows and columns of output image, O, respectively, calculation of real position coordinates $(y_i, x_j)$ of an output image pixel, embedded within the input image grid, is done using specific forms of the pixel position control functions of Step 3, as:

$$y_i = F_i = \Delta_r * (\text{Tangent\_row}) + M2, \text{ and}$$

$$x_j = F_j = \Delta_c * (\text{Tangent}_{13} \text{ column}) + N2$$

Non-linear Mode (b): Vertical non-linear calling only, whereby the number of rows 12 (FIG. 1A) of input image, I (not shown), in input image grid 10 (FIG. 1A), is non-linearly scaled-up or scaled-down, to the number of rows 20 (FIG. 1B) of output image, O (not shown), in output image grid 18 (FIG. 1B). The specific form of the general pixel position control function, $F_i = F(s,t,a,b\lambda_1, \mu_1)$, for scaling rows of coordinate i, in input image grid 10 (FIG. 1A), is the same as that of non-linear scaling mode (a), for vertical non-linear scaling, $F_i = \Delta_r * (\text{Tangent\_row}) + M2$, where $F_i$ is a real number. Row coordinate $y_i$, of the real position $(y_i, x_j)$, of output pixel 24 (in output image grid 18, FIG. 1B), located in connecting rid 26 (FIG. 1C), is calculated from $F_j$ as:

$$y_i = F_i = \Delta_r * (\text{Tangent\_row}) + M2.$$

The number of columns 14 (FIG. 1A) of input image, I, in input image grid 10 (FIG. 1A), is linearly scaled-up or scaled-down, to the number of columns 22 (FIG. 1B) of output image, O, in output image grid 18 (FIG. 1B) as follows:

For each column 22 (FIG. 1B) in output image grid 18 (FIG. 1B), having coordinate t, for t=0,1,2, ...N1, calculate:

$F_j = t/b$, where $F_j$ is a real number, which corresponds to a specific form of the general pixel position control function, $F_j = F(s,t,a,b\lambda_2, \mu_2)$, for scaling columns of coordinate j, in input image grid 10 (FIG. 1A). Column coordinate, $x_j$, of the real position $(y_i, x_j)$, of output pixel 24 (in output image grid 18, FIG. 1B), located in connecting rid 26 (FIG. 1C), is calculated from $F_j$ as:

$$x_j = F_j = t/b.$$

Thus, for non-linear mode (b), featuring vertical non-linear scaling only, of the number of rows of input image, I, to the number of rows of output image, O, and linear scaling of the number of columns of input image, I, to the number of columns of output image, O, calculation of real position coordinates $(y_i, x_j)$ of an output image pixel, embedded within the input image grid, is done using specific forms of the pixel position control functions of Step 3, as:

$$y_i = F_i = \Delta_r * (\text{Tangent\_row}) + M2, \text{ and}$$

$$x_j = F_j = t/b.$$

Non-linear Mode (c): Horizontal non-linear scaling only, whereby the number of columns 14 (FIG. 1A) of input image, I (not shown), in input image grid 10 (FIG. 1A), is non-linearly scaled-up or scaled-down, to the number of columns 22 (FIG. 1B) of output image, O (not shown), in output image grid 18 (FIG. 1B).). The specific form of the general pixel position control function, $F_j = F(s,t,a,b\lambda_2, \mu_2)$, for scaling columns of coordinate j, in input image grid 10 (FIG. 1A), is the same as that of non-linear mode (a), for horizontal non-linear scaling, $F_j = \Delta_c * (\text{Tangent\_column}) + N2$, where $F_j$ is a real number, Column coordinate, $x_j$, of the real position $(y_i, x_j)$, of output pixel 24 (in output image grid 18, FIG. 1B), located in connection grid 26 (FIG. 1C), is calculated from $F_j$, as:

$$x_j = F_j = \Delta_c * (\text{Tangent\_column}) + N2.$$

The number of rows 12 (FIG. 1A) of input image, I, in input image grid 10 (FIG. 1A), is linearly scaled-up or scaled-down to the number of rows 20 (FIG. 1B) of output image, O, in output image grid 18 (FIG. 1B) as follows:

For each row 20 (FIG. 1B) in output image grid 18 (FIG. 1B), having coordinate s, for s=0,1,2, ... M1, calculate:

$F_i = s/a$, where $F_i$ is a real number, which corresponds to a specific form of the general pixel position control function, $F_i = F(s,t,a,b,\lambda_1 \mu_1)$, for scaling rows of coordinate i, in input image grid 10 (FIG. 1A). Row coordinate, $y_i$, of the real position $(y_i, x_j)$, of output pixel 24 (in output image grid 18, FIG. 1B), located in connection grid 26 (FIG. 1C), is calculated from $F_i$, as:

$$y_i = F_i = s/a.$$

Thus, for non-linear mode (c), featuring horizontal non-linear scaling only, of the number of columns of input image, I, to the number of columns of output image, O, and linear scaling of the number of rows of input image, I, to the number of rows of output image O, calculation of real position coordinate $(y_i, x_j)$ of an output image pixel, embedded within the input image grid, is done using specific forms of the pixel position control functions of Step 3, as:

$$y_i = F_i = s/a, \text{ and}$$

$$x_j = F_j = \Delta_c * (\text{Tangent\_column}) + N2.$$

In the case of linear scale-up or scale-down image resolution conversion (FIGS. 2A, 2B, and 2C), calculation of real position coordinates of an output image pixel, embedded within the input image grid, using the pixel position control functions of Step 3, are featured here.

For vertical linear scaling, the number of rows 36 (FIG. 2A) of input image, I (not shown), in input image grid 34 (FIG. 2A), are linearly scaled-up or scaled-down, to the number of rows 44 (FIG. 2B) of output image, O (not shown), in output image grid 42 (FIG 2B) as follows:

For each row 44 (FIG. 2B) in output image grid 42 (FIG. 2B), having coordinate s, for s=0,1,2,. . . M1calculate:

$F_i = s/a$, where $F_i$ is a real number, which corresponds to a specific form of the general pixel position control function, $F_i = F(s,t,a,b,\lambda_1 \mu_1)$, for scaling rows of coordinate i, in input image grid 34 (FIG. 2A). Row coordinate, $y_i$, of the real position $(y_i, x_j)$, of output pixel 48 (in output image grid 42, FIG. 2B), located in connection grid 50 (FIG. 2C), is calculated from $F_i$, as:

$$y_i = F_i = s/a.$$

For horizontal linear scaling, the number of columns 38 (FIG. 2A) of input image, I (not shown), in input image grid 34 (FIG. 2A), are linearly scaled-up or scaled-down, to the number of columns 46 (FIG. 2B) of output image, O (not shown), in output image grid 42 (FIG. 2B) as follows:

For each column 46 (FIG. 2B) in output image grid 42 (FIG. 2B), having coordinate t, for t=0,1,2, . . . N1, calculate:

$F_j = t/b$, where $F_j$ is a real number, which corresponds to a specific form of the general pixel position control function, $F_j = F(s,t,a,b,\lambda_2 \mu_2)$, for scaling columns of coordinate j, in input image grid 34 (FIG. 2A). Column coordinate, $x_j$, of the real position $(y_i, x_j)$, of output pixel 48 (in output image grid 42, FIG. 2B), located in connection grid 50 (FIG. 2C), is calculated from $F_j$, as:

$$x_j = F_j = t/b. \qquad 5$$

Thus, for linear vertical scaling of the number of rows of input image, I, to the number of rows of output image, O, and linear horizontal scaling of the number of columns of input image, I, to the number of columns of output image, O, calculation of real position coordinates $(y_i, x_j)$ of an output image pixel, embedded within the input image grid, is done using specific forms of the pixel position control functions of Step 3, as:

$$y_i = F_i = s/a, \text{ and}$$

$$x_j = F_j = t/b.$$

In step 5, there is identification of position coordinates, or indices, of neighbor pixels in input image grid (10 of FIG. 1A, for the case of non-linear scale-up or scale-down image resolution conversion, or, 34 of FIG. 2A, for the case of linear scale-up or scale-down image resolution conversion) surrounding real pixel position coordinates (32 in connection grid 26 of FIG. 1C, for the case of non-linear scale-up or scale-down image resolution conversion, or, 56 in connection grid 50, for the case of linear scale-up or scale-down image resolution conversion, calculated from the non-linear or linear pixel position control functions in Step 4) of output image pixel position coordinates (24 in output image grid 18 of FIG. 1B, for the case of non-linear scale-up or scale-down image resolution conversion, or, 48 in output image grid 42 of FIG. 2B, for the case of linear scale-up or scale-down image resolution conversion).

As examples, two alternative preferred embodiments, each applicable to either case of non-linear, or linear, scale-up or scale-down image resolution conversion, of the present invention, of identification of position coordinates of neighbor pixels in the input image grid, surrounding real pixel position coordinates of the output image pixel position located in the connection grid are featured here. The first is based on nine neighbor pixel positions, and the second is based on four neighbor pixel positions. In general, n neighbor pixel positions can be used for Step 5 in the method of the present invention.

Figure 4:
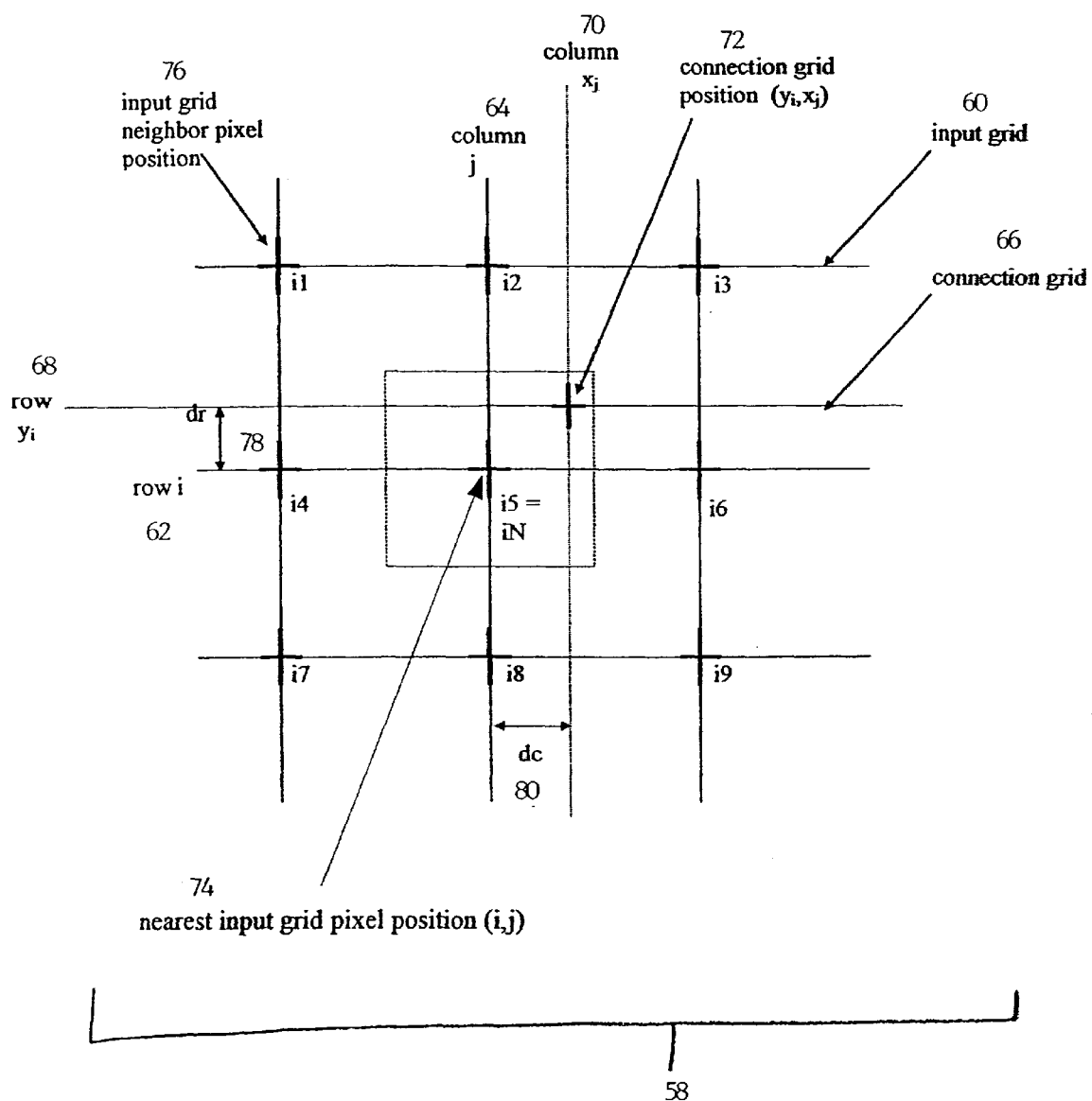
FIG. 4 is an illustration showing either the micro-level relationship between the input grid of FIG. 1A, featuring nine nearest neighbor pixel positions, and the connection grid of FIG. 1C, featuring the real valued pixel position of the output pixel, or, the micro-level relationship between the input grid of FIG. 2A, featuring nine nearest neighbor pixel positions, and the connection grid of FIG. 2C, featuring the real valued pixel position of the output pixel, relating to the preferred embodiment of non-linear and linear scale-up or scale-down image resolution conversion, according to the method of the present invention.

In the first alternative preferred embodiment featuring nine neighbor pixel positions in the input image grid, surrounding real pixel position coordinates of the output image pixel position located in the connection grid, reference is made to FIG. 4, of an illustration of micro-grid 58, showing the micro-level relationship between integer valued input grid pixels positions, and real valued connection grid pixel positions, relating the input image grid (10 of FIG. 1A, for the case of non-linear scale-up or scale-down image resolution conversion, or, 34 of FIG. 2A, for the case of linear scale-up or scale-down image resolution conversion) to the connection grid (26 of FIG. 1C, for the case of non-linear scale-up or scale-down image resolution conversion, or, 50 of FIG. 2C, for the case of linear-scale-up or scale-down image resolution conversion).

Micro-grid 58 of FIG. 4 features input image grid 60, with its corresponding input image grid pixel position coordinates row i 62 and column j 64, and connection grid 66, with its corresponding connection grid pixel position coordinates row $y_i$ 68 and column $x_j$ 70. Connection grid position coordinates $(y_i, x_j)$ 72 represent real position coordinates of output pixel position coordinates (s,t), embedded within the input image grid, previously calculated in Step 4. Integer valued input image grid pixel position coordinates (i,j) are calculated from real valued connection grid pixel position coordinates $(y_i, x_j)$ as follows:

i(integer valued)=Floor($y_i$+0.5), and j(integer valued)=Floor($x_j$+0.5).

In general, pixel position coordinates i and j can be real or integer. In this preferred embodiment of the present invention, position coordinates row i and column j, and corresponding position indices (i,j), and integers (i.e., not real), calculated from the Floor function, but, in general, another function may be used for this calculation.

In FIG. 4, integer valued input image grid position coordinates of nine neighbor pixels, i1through i9(76 as i1, for example), in input image grid 60, surrounding real valued connection grid position coordinates $(y_i, x_j)$ 72 in connection grid 66, are identified from and include, input image grid pixel position coordinates (i,j) of the nearest input grid pixel iN 74. In this alternative preferred embodiment of the method of the present invention, featuring an odd number of input image grid neighbor pixels, the position of the nearest input image grid pixel iN 74 is chosen as the center position of the nine input image grid neighbor pixels, i1 through i9, and is assigned pixel position coordinates (i,j). The nine input image grid neighbor pixels, with values, i1, i2, i3, i4, i5, i6, i7, i8, and i9, are assigned to the following integer valued input image grid coordinates as follows: (i−1, j−1), (i−1, j), (i−1, j+1), (i, j−1), (i, j), (i, j+1), (i+1, j−1), (i+1, j), and (i+1, j+1), respectively.

The second alternative preferred embodiment, described here, but not shown, features four neighbor pixel positions in the input image grid, surrounding real pixel position coordinates of the output image pixel position located in the connection grid. Integer valued input grid neighbor pixel position coordinates (i,j) surrounding real valued connection grid position coordinates $(y_i, x_j)$ are calculated from real valued connection grid pixel position coordinates $(y_i, x_j)$ as follows:

i (integer valued)=Floor ($y_i$), and j (integer valued)=Floor ($x_j$).

In this alternative preferred embodiment of the method of the present invention, featuring an even number of input grid neighbor pixels, there is no center input image grid neighbor pixel. Integer valued position coordinates of the nearest input image grid pixel iN, $(i_0, j_0)$ are calculated as follows:

$i_0$ (integer valued)=Floor ($y_i$+0.5), and $j_0$ (integer valued)=Floor ($x_j$+0.5).

In general, pixel position coordinates i and j, and, $i_0$ and $j_0$, can be real or integer. In this preferred embodiment of the present invention, position coordinates (i,j), and $(i_0, j_0)$ are integers (i.e., not real), calculated from the Floor function, but, in general, another function may be used for this calculation, respectively.

Integer valued position coordinates, of the four neighbor pixels in the input image grid, i1, i2, i3, and i4, surrounding real valued connection grid position coordinates $(y_i, x_j)$ in the connection grid, are assigned as follows: (i,j), (i, j+1), (i, j+1), and (i+1, j+1), respectively. For the purpose of calculating local coefficients from values of these four neighbor pixels (Step 7), pixel position coordinates $(i_0, j_0)$ of input image grid nearest pixel iN is assigned as one of the four neighbor pixel position coordinates.

In Step 6, applicable to each alternative preferred embodiment featuring nine or four neighbor pixel positions, delta row and delta column functional differences between real valued output pixel, or connection grid, position coordinates $(y_i, x_j)$ (calculated from non-linear or linear pixel position control functions in Step 4), and integer valued neighbor pixel positions (identified and calculated in Step 5), are defined and calculated as follows:

delta row, dr=$(y_i-i)*K_i$, for $K_i>0$, and delta column, dc=$(x_j-j)*K_j$, for $K_j>0$, where $K_i$ and $K_j$ are real valued parameters, and where dr and dc are real numbers. These equations of delta row, dr, and delta column, dc, are applicable to both illustrative alternative preferred embodiments featuring either nine or four neighbor pixel positions, as well as being applicable to the case of m neighbor pixel positions as configured in a micro-grid, relating input pixel positions to real valued output pixel positions located in a connection grid.

In FIG. 4, illustrating the first alternative preferred embodiment featuring nine neighbor pixel positions, dr 78, in micro-grid 58, represents delta row, or the difference between row i 62 of integer valued input image pixel position coordinates, (i,j) of nearest neighbor pixel i5=iN 74 located in input grid 60, and row $y_i$ 68 of real valued pixel position coordinates $(y_i,x_j)$ 72 of the output image pixel position located in connection grid 66. Similarly, dc 80, in micro-grid 58, represents delta column, or the difference between column j 64 of integer valued input image pixel position coordinates, (i,j) of nearest neighbor pixel i5=iN 74 located in input grid 60, and column $x_j$ 70 of real valued pixel position coordinates $(y_i,x_j)$ 72 of the output image pixel position located in connection grid 66.

In Step 7, applicable to either case of non-linear, or linear, scale-up or scale-down image resolution conversion, of the present invention, there is assignment of known values to the neighbor pixels (whose positions were identified in Step 5) surrounding the real pixel position (calculated from the non-linear or linear pixel position control functions in Step 4). In the first alternative preferred embodiment (micro-grid 58 of FIG. 4) featuring nine neighbor pixel positions in input image grid 60 (FIG. 4), known values of the nine neighbor pixels are assigned as follows:

i1=I(i−1, j−1), i2=I(i−1, j), i3=I(i−1, j+1), i4=I(i, j−1), i5=iN=I(i, j), i6=I(i, j+1), i7=I(i+1, j−1), i8=I(i+1, j), and i9=I(i+1, j+1).

Here, i5=iN, represents the value of input grid pixel position (i,j) 74 in FIG. 4, nearest real valued pixel position coordinates $(y_i,x_j)$ 72 of the output image pixel position located in connection grid 66.

In the second preferred alternative embodiment featuring four neighbor pixel positions in an input image grid (not shown), known values of the four neighbor pixels are assigned as follows:

i1=I(i, j), i2=I(i, j+1), i3=I(i, j+1), and i4=I(i+1,j +1).

Here, the value of input image grid neighbor pixel iN, with input image grid pixel position coordinates $(i_0,j_0)$, nearest to the real valued connection grid position coordinates $(y_i, x_j)$ in the connection grid, is assigned from one of the values of the four input image grid neighbor pixels, i1, i2, i3, or i4.

In Step 8, applicable to either case of non-linear, or linear, scale-up or scale-down image resolution conversion, of the present invention, there is definition and calculation of local coefficients form known values of the neighbor pixels in the input image grid (assigned in Step 7), surrounding the real pixel position (calculated from non-linear or linear pixel position control functions in Step 4). Values of these local coefficients are used in calculating preliminary values of output pixels (Step 9).

In the first alternative preferred embodiment (micro-grid 58 of FIG. 4) featuring nine neighbor pixels 76 in input image grid 60 surrounding real pixel position 72 in connection grid 66, nine local coefficients are defined and calculated by using linear combinations of the known values of the surrounding nine neighbor pixels, as follows:

Case 1: shifting to the left of the surrounding neighbor pixels.

a1=+4*i1−8*i2+4*i3−8*i4+16*i5−8*i6+4*i7−8*i8+4*i9, a2=−2*i1+2*i3+4*i4−4*i6−2*i7+2*i9, a3=−2*i1+4*i2−2i3+2*i7−4*i8+2*i9, a4=+2*i2−4*i5+2*i8, a5=+2*i4−4*i5+2*i6, a6=i1−i3−i7+i9, a7=−i2+i8, a8=−i4+i6, and a9=i5.

Case 2: shifting to the right of the surrounding neighbor pixels.

a1=+0.25*i1−0.5*i2+0.25*i3−0.5*i4+i5−0.5*i6+0.25*i7−0.5*i8+0.25*i9, a2=−0.25*i1+0.25*i3+0.5*i4−0.5*i6−0.25*i7+0.25*i9, a3=−0.25*i1+0.5*i2−0.25*i3+0.25*i7−0.5*i8+0.25*i9, a4=+0.5*i2−i5+0.5*i8, a5=+0.5*i4−i5+0.5*i6, a6=+0.25*i1−0.25*i3−0.25*i7+0.25*i9, a7=−0.5*i2+0.5*i8, a8=−0.5*i4+0.5*i6, and a9=i5.

Case 1 and Case 2is used for calculating values of local coefficients of the surrounding neighbor pixels. According to implementation of the image processing hardware or software, these equations provide an efficient way to calculate the coefficients by linear combinations of shifting the input image grid neighbor pixel values i1 through i9, to the left, or to the right, including round-off, according to case 1or case 2, respectively. An example of this for case 1, is in the calculation of local coefficient a1, whereby the component +4*i1 is equivalent to shifting the value, i1, two times to the left, including round-off. An example of this for case 2, is in calculation of local coefficient a1, whereby the component +0.25*i1 is equivalent to shifting the value, i1, two times to the right, including round-off.

In the second alternative preferred embodiment featuring four neighbor pixels in the input image grid, surrounding the real pixel position located in the connection grid, four local coefficients are defined and calculated by using linear combinations of the known values of the surrounding four neighbor pixels, as follows:

a1=+i1+i4−(i2+i3), a2=+i3−i1, a3=+i2−i1, and a4=+i1.

Here, linear combinations of the values of the four input image grid neighbor pixels are used for calculating the four coefficients, without need for shifting the values i1 through 14.

In Step 9, applicable to either case of non-linear, or scale-up or scale-down image resolution conversion, of the present invention, a preliminary value of the output pixel, positioned in output image grid (18 of FIG. 1B, for the case of non-linear scale-up or scale-down image resolution conversion, or, 42 of FIG. 2B, for the case of linear scale-up or scale-down image resolution conversion), and defined as Val, is calculated. In this preferred embodiment of the method of the present invention, integer values of the output image pixels are calculated using the Floor function, but in general, another function may be used for this calculation.

In the first alternative preferred embodiment (micro-grid 58 of FIG. 4) featuring nine neighbor pixels 76 in input image grid 60 surrounding real pixel position 72 in connection grid 66, of an output image pixel position in output image grid (18 of FIG. 1B, or, 42 of FIG. 2B), $$\text{Val}=\text{Floor}[a1^*dr2^*dc2+a2^*dr2^*dc+a3^*dr^*dc2+a4^*dr2+a5^*dc2+a6^*dr^*dc+a7^*dr+a8^*dc+a9+0.5],$$

where $dr2=dr^*dr$, and $dc2=dc^*dc$, are defined as squares of the delta row and delta column functional differences defined and calculated in Step 6.

In the second alternative preferred embodiment featuring four neighbor pixels in the input image grid surrounding the real pixel position in the connection grid, of an output image pixel position in output image grid (18 of FIG. 1B, or, 42 of FIG. 2B), $$\text{Val}=\text{Floor}[a1^*dr^*dc+a2^*dr+a3^*dc+a4+0.5].$$

In the method of the present invention, applicable to either case of non-linear, or linear, scale-up or scale-down image resolution conversion, the general procedure of calculating the preliminary value of an output pixel located in the output image coordinate system, features the following differential prescription for a two-dimensional input image having $n^2$ neighbor pixels: preliminary output value=$(A_1, A_2 \ldots, A_{q}^{2})°[\Pi_{p=1 \text{ to } 2}(1, dx_p; dx_p^2, \ldots, dx_p^{n-1}]$,
where ° represents the inner multiplication between two vectors, $dx_1$ to $dx_2$ are the delta differences between the real valued output image positions defined over the two-dimensional connection grid coordinate system and the input image positions defined over the two-dimensional input image grid coordinate system. The $A_j$, for $j=1,2,\ldots,n$ are the local coefficients calculated from known values of the $n^2$ neighbor pixels, and the vector $\Pi_{p=1 \text{ to } 2}(1, dx_p, dx_p^2, \ldots, dx_p^{n-1})$ is defined as the one-times dot multiplication (which results in a vector of length $n^2$) as follows:

$$\Pi_{p=1 \text{ to } 2}(1, dx_p, dx_p^2, \ldots, dx_p^{n-1}) = (1, dx_1, dx_1^2, \ldots, dx_1^{n-1})^*(1, dx_2, dx_2^2, \ldots, dx_2^{n-1}).$$

For example, for $n=3$, $n^2=9$ neighbors pixels, it follows that $$\Pi_{p=1 \text{ to } 2}(1, dx_p, dx_p^2, \ldots, dx_p^{n-1}) = (1, dx_1, dx_1^2)^*(1, dx_2, dx_2^2) = (1, dx_1, dx_1^2, dx_2, dx_1 dx_2, dx_2 dx_1^2, dx_2^2, dx_2^2 dx_1, dx_2^2 dx_1^2).$$

In the method of the present invention, applicable to either case of non-linear, or linear, scale-up or scale-down image resolution conversion, the general procedure of calculating the preliminary value of an output pixel located in the output image coordinate system features the following differential prescription for a u-dimensional input image having $v^u$ neighbor pixels:

preliminary output value=$(A_1, A_2 \ldots, A_v u)°[\Pi_{p=1 \text{ to } u}(1, dx_p, dx_p^2, \ldots, dx_p^{v-1})]$, where ° represents the inner multiplication between two vectors, the components $(dx_1, dx_2, \ldots, dx_u)$ are u independent differences between the real valued output image positions defined over the u-dimensional connection grid coordinate system and the input image positions defined over the u-dimensional input image grid coordinate system. The $A_j$, for $j=1,2,\ldots,v^u$ are the local coefficients calculated from known values of the $v^u$ neighbor pixels defined over the u-dimensional input image grid coordinate system, and the vector $\Pi_{p=1 \text{ to } u}(1, dx_p, dx_p^2, \ldots, dx_p^{v-1})$ is defined as the u-times dot multiplication (which results in a vector of length $v^u$) as follows:

$$\Pi_{p=1 \text{ to } u}(1, dx_p, dx_p^2, \ldots, dx_p^{v-1}) = (1, dx_1, dx_1^2, \ldots, dx_1^{v-1})^*(1, dx_2, dx_2^2, \ldots, dx_2^{v-1})^{***}(1, dx_u, dx_u^2, \ldots, dx_u^{v-1}).$$

In Step 10, applicable to either case of non-linear, or linear, scale-up or scale-down image resolution conversion, of the present invention, the final value of an output image pixel, O(s,t), positioned in output image grid (18 of FIG. 1B, or, 42 of FIG. 2B), is calculated and assigned.

In the first alternative preferred embodiment (micro-grid 58 of FIG. 4) featuring nine neighbor pixels 76 in input image grid 60 surrounding real pixel position 72 in connection grid 66, of an output image pixel position in output image grid (18 of FIG. 1B, or, 42 of FIG. 2B), the final value of output image pixel, O(s,t), is:

Val_out=$p^*$Val+$(1-p)^*$iN, for $0 \leq p \leq 1$, where Val is the preliminary value of the output image pixel (calculated in Step 9), p is a parameter, and iN=i5, represents the value of input image grid pixel position (i,j) 74, nearest real valued pixel position coordinates $(y_i, x_j)$ 72 of the output image pixel position located in connection grid 66, in micro-grid 58 (FIG. 4), and O(s,t)=Val_out.

In the second alternative preferred embodiment featuring four neighbor pixels in the input image grid surrounding the real pixel position in the connection grid, of an output image pixel position in output image grid (18 of FIG. 1B, or, 42 of FIG. 2B), the final value of output image pixel, O(s,t), is:

Val_out=$p^*$Val+$(1-p)^*$iN, for $0 \leq p \leq 1$,

Where Val is the preliminary value of the output image pixel (calculated in Step 9), p is a parameter, and iN, represents the value of input image grid pixel position (i,j), nearest real valued pixel position coordinates $(y_i, x_j)$ of the output image pixel position located in the connection grid, and O(s,t)=Val_out.

In Step 11, applicable to either case of non-linear, or linear, scale-up or scale-down image resolution conversion, of the present invention, the final value of a next output image pixel, positioned in output image grid (18 of FIG. 1B, or, 42 of FIG. 2B), is calculated and assigned, by repeating Steps 1 through 10.

In Step 12, the method of non-linear and linear scale-up or scale-down image resolution conversion of the present invention features display of a non-linear or linear, scale-up, scale-down, or mixed mode scale-up/scale-down resolution converted image on a display screen.

Following are additional general features, applicable to the preferred embodiments of the method of non-linear and linear scale-up or scale-down image resolution conversion, of the present invention:

1. If the input image features two levels of pixel values (black and white), such as in printing machines, then convert each color component to gray scale (i.e., no color) values, whereby 0 is converted to 0, and 1 is converted to 255. This procedure changes two levels into byte gray scale level. The input image is then resolution converted according to the method of the present invention by following Steps 1 through 11. The output image is gray scale. Use dithering algorithm to reduce the output image back to two levels.
2. If the input image is a gray scale image, then the input image is resolution converted according to the method of the present invention by following Steps 1 through 11.
3. If the input image is a color image, such as RGB or CMY, then each color component, such as Red, Green, and Blue is resolution converted according to the method of the present invention by following Steps 1 through 11.
4. If the input image is a video image, formatted as luminance and chrominance components, such as YUV or YCrCb, there is selection from the following cases according to hardware or software attributes of the image processing equipment:

Case 1: Perform image resolution conversion of each luminance and chrominance component according to the method of the present invention by following Steps 1 through 11.

Case 2: Perform image resolution conversion of the luminance component according to the method of the present invention by following Steps 1 through 11. Perform image resolution conversion of the chrominance component according to the present invention by following Steps 1 through 11, but, in Steps 5 through 11, use the second alternative preferred embodiment featuring four neighbor pixel positions and four coefficients calculated from values of the four neighbor pixels.

Case 3: Perform image resolution conversion of the luminance component according to the method of the present invention by following Steps 1 through 11. Perform image resolution conversion of the chrominance component by taking iN as the output value of the output pixel.

While the invention has been described with respect to one general, and several specific, embodiments, it will be appreciated that many variations, modifications and other applications of the invention may be made.

What is claimed is:

1. A non-linear and linear method of scale-up, scale-down, or mixed mode scale-up/scale-down image resolution conversion, the steps of the method being performed by a data processor, the method comprising the steps of:

(a) receiving an input image featuring a plurality of pixels, said input image plotted in an input image grid, said input image grid featuring an input image grid coordinate system;

(b) providing pixel position control functions, said pixel position control functions used to defined and set up a connection grid with a connection grid coordinate system, whereby said pixel position control functions and said connection grid with said connection grid coordinate system each relate an output image grid with an output image grid coordinate system to said input image grid with said input image grid coordinate system;

(c) calculating real position coordinates, located in said connection grid, of each of a plurality of output pixel positions, located in said output image grid, from said pixel position control functions;

(d) determining position coordinates of neighbor pixels, located in said input image grid, surrounding each said real position coordinates of said each of a plurality of output pixel positions;

(e) calculating differences between each said real position coordinates of said each of a plurality of output pixel positions and said position coordinates of said neighbor pixels, located in said input image grid;

(f) calculating for said each of a plurality of output pixel positions, a new set of local coefficients from known values of said neighbor pixels surrounding each said real position coordinates of said each of a plurality of output pixel positions;

(g) calculating a value for said each of a plurality of output pixels located in said output image grid from a differential prescription for a two dimensional image featuring said pixels and featuring $n^2$ said neighbor pixels, said differential prescription comprising an inner multiplication between two vectors, first of said two vectors featuring one-times dot multiplication of said differences between each said real position coordinates defined over a two-dimensional said connection grid coordinate system of each of a plurality of output pixel positions and said position coordinates of said $n^2$ neighbor pixels defined over a two-dimensional said input image grid coordinate system, and second of said two vectors featuring said set of local coefficients calculated from said known values of said $n^2$ neighbor pixels; and (h) displaying an output image featuring said a value for said each of a plurality of said output pixels located in said output image grid.

2. The method of claim 1, wherein said pixel position control functions are non-linear functions of output pixel position coordinates, image scaling factors, and free parameters, said free parameters are real numbers used for controlling extend of non-linearity of the non-linear image resolution conversion from said input grid to said output grid.

3. The method of claim 1, wherein said pixel position control functions are linear functions of output pixel position coordinates, image scaling factors, and free parameters, said free parameters are real numbers not affecting the linear image resolution conversion from said input grid to said output grid.

4. The method of claim 1, wherein said connection grid with said connection grid coordinate system is embedded within said input image grid coordinate system, said connection grid with said connection grid coordinate system is used for locating said real pixel position coordinates corresponding to said output image pixel position coordinates.

5. The method of claim 1, wherein said output image grid initially features an empty set of said values of said plurality of output image pixels.

6. The method of claim 1, wherein scaling of said input image is selected from the group consisting of non-linear scaling, non-linear scaling and linear scaling, and linear scaling.

7. The method of claim 1, wherein the step of calculating said value for said each of a plurality of output pixels located in said output image grid is from a differential prescription for a u dimensional image featuring said pixels and featuring $v^u$ said neighbor pixels, said differential prescription comprising $$(A_1, A_2, \ldots, A_{v^u}) \circ \left[ \prod_{p=1\ to\ u} (1, dx_p, dx_p^2, \ldots, dx_p^{v-1}) \right],$$

whereby ° represents said inner multiplication between two vectors, said $dx_1$ to $dx_u$ are said differences between said real valued output image positions defined over a u-dimensional said connection grid coordinate system and said input image positions defined over a u-dimensional said input grid coordinate system, said $A_j$, for $j=1,2,\ldots,v^u$ are said local coefficients calculated from said known values of said $v^u$ neighbor pixels defined over said u-dimensional input image grid coordinate system, and said vector $\Pi_{p=1\ to\ u} (1, dx_p, dx_p^2, \ldots, dx_p^{v-1})$ is defined as (u−1)-times dot multiplication $\Pi_{p=1\ to\ u} (1, dx_p, dx_p^2, \ldots, dx_p^{v-1}) = (1, dx_1, dx_1^2, \ldots, dx_1^{v-1})*(1, dx_2, dx_2^2, \ldots, dx_2^{v-1})***(1, dx_u, dx_u^2, \ldots, dx_u^{v-1})$, whereby said (u−1)-times dot multiplication results in a vector of length $v^u$.

8. The method of claim 1, wherein said input image is selected from the group consisting of black and white, gray scale, color, and video.

9. A non-linear and linear method of scale-up, scale-down, or mixed mode scale-up/scale-down image resolution conversion, featuring calculating a value for each of a plurality of output pixels located in an output image grid from a differential prescription for a two dimensional image featuring pixels and featuring $n^2$ neighbor pixels, said differential prescription comprising an inner multiplication between two vectors, first of said two vectors featuring one-times dot multiplication of differences between each real position coordinates coordinates defined over a two-dimensional connection grid coordinate system of each of a plurality of output pixel positions and positions coordinates of said $n^2$ neighbor pixels defined over a two-dimensional input image grid coordinate system, and second of said two vectors featuring a set of local coefficients calculated form known values of said $n^2$ neighbor pixels.

10. The method of claim 9 wherein said output image grid initially features an empty set of said values of said plurality of output image pixels.

11. The method of claim 9 wherein a new said set of local coefficients is calculated for said each of a plurality of output pixels.

12. The method of claim 9 wherein calculating said value for said each of a plurality of output pixels located in said output image grid is from a differential prescription for a u dimensional image featuring said pixels and featuring $v^u$ said neighbor pixels, said differential prescription comprising $$(A_1, A_2, \ldots, A_{v^u}) \circ \left[ \prod_{p=1 \text{ to } u} (1, dx_p, dx_p^2, \ldots, dx_p^{v-1}) \right],$$

whereby ° represents said inner multiplication between two vectors, said $dx_1$ to $dx_u$ are said differences between said real valued output image positions defined over a u-dimensional said connection grid coordinate system and said input image positions defined over a u-dimensional said input grid coordinate system, said $A_j$, for $j=1,2,\ldots,v^u$ are said local coefficients calculated from said known values of said $v^u$ neighbor pixels defined over said u-dimensional input image grid coordinate system, and said vector $\Pi_{p=1 \text{ to } u} (1, dx_p, dx_p^2, \ldots, dx_p^{v-1})$ is defined as (u−1)-times dot multiplication $\Pi_{p=1 \text{ to } u} (1, dx_p, dx_p^2, \ldots, dx_p^{v-1}) = (1, dx_1, dx_1^2, \ldots, dx_1^{v-1}) * (1, dx_2, dx_2^2, \ldots, dx_2^{v-1}) * ** (1, dx_u, dx_u^2, \ldots, dx_u^{v-1})$, whereby said u-times dot multiplication results in a vector of length $v^u$.

\* \* \* \* \*